United States Patent
Biesinger et al.

(10) Patent No.: US 11,879,832 B2
(45) Date of Patent: Jan. 23, 2024

(54) PHOTOACOUSTIC SPECTROSCOPE HAVING A VIBRATING STRUCTURE AS SOUND DETECTOR

(71) Applicant: Hahn-Schickard-Gesellschaft für angewandte Forschung e. V., Villingen-Schwenningen (DE)

(72) Inventors: Daniel Biesinger, Villingen-Schwenningen (DE); Achim Bittner, Heilbronn (DE)

(73) Assignee: HAHN-SCHICKARD-GESELLSCHAFT FÜR ANGEWANDTE FORSCHUNG E. V., Villingen-Schwenningen (DE)

(*) Notice: Subject to any disclaimer, the term of this patent is extended or adjusted under 35 U.S.C. 154(b) by 225 days.

(21) Appl. No.: 17/310,818

(22) PCT Filed: Feb. 26, 2020

(86) PCT No.: PCT/EP2020/054966
§ 371 (c)(1),
(2) Date: Aug. 25, 2021

(87) PCT Pub. No.: WO2020/173974
PCT Pub. Date: Sep. 3, 2020

(65) Prior Publication Data
US 2022/0136957 A1   May 5, 2022

(30) Foreign Application Priority Data
Feb. 26, 2019 (EP) .................... 19159297

(51) Int. Cl.
*G01N 21/17* (2006.01)
*G01N 29/032* (2006.01)
(Continued)

(52) U.S. Cl.
CPC ....... *G01N 21/1702* (2013.01); *G01N 29/032* (2013.01); *G01N 29/2425* (2013.01);
(Continued)

(58) Field of Classification Search
CPC ............. G01N 21/1702; G01N 29/032; G01N 29/2425; G01N 29/348; G01N 2021/1704;
(Continued)

(56) References Cited

U.S. PATENT DOCUMENTS 10,495,612 B2 * 12/2019 Dehe ................ G01N 21/1702
2009/0266144 A1 * 10/2009 Rezachek .......... G01N 21/1702
73/24.02
(Continued)

FOREIGN PATENT DOCUMENTS

DE    69723891 T2    6/2004
EP    2543987 A1    1/2013

OTHER PUBLICATIONS

English Translation of International Search Report in PCT/EP2020/054966 dated May 29, 2020.
(Continued)

*Primary Examiner* — Suman K Nath
(74) *Attorney, Agent, or Firm* — Knobbe, Martens, Olson & Bear, LLP (57) ABSTRACT

The invention relates, in a first aspect, to a photoacoustic spectroscope for analyzing gas, comprising an infrared emitter (3), which can be modulated, an analysis volume (1), which can be filled with gas, and a sound pressure detector. The sound pressure detector comprises a structure (5) capable of vibrating, an actuator and a measurement unit, wherein the actuator is configured to actively excite vibration of the structure (5) capable of vibrating and the measurement unit can measure the vibration properties of the
(Continued)

structure (5) capable of vibrating, which measurement depends on the formation of the sound pressure waves.

In an additional aspect, the invention relates to a method for analyzing gas, comprising the provision of a photoacoustic spectroscope for analyzing gas, irradiating the gas with infrared radiation, modulated by a modulation frequency, to generate sound pressure waves, exciting the structure (5) capable of vibrating at an excitation frequency, measuring the vibration properties of the structure (5) capable of vibrating, which measurement depends on the sound pressure, and determining the sound pressure of the gas based on the measured vibration properties.

23 Claims, 2 Drawing Sheets (51) Int. Cl.
    *G01N 29/24*     (2006.01)
    *G01N 29/34*     (2006.01)

(52) U.S. Cl.
    CPC ... *G01N 29/348* (2013.01); *G01N 2021/1704* (2013.01); *G01N 2021/1708* (2013.01); *G01N 2291/021* (2013.01); *G01N 2291/02809* (2013.01)

(58) Field of Classification Search
    CPC ..... G01N 2021/1708; G01N 2291/021; G01N 2291/02809; G01N 33/0027; G01N 2201/061; G01J 2003/1213; G01J 3/108; G01J 3/0205; G01J 3/0213; G01J 3/0232; G01J 3/0256

See application file for complete search history.

(56) References Cited

U.S. PATENT DOCUMENTS

| | | | |
|---|---|---|---|
| 2011/0023594 A1* | 2/2011 | Pelletier | G01N 29/2418 73/152.18 |
| 2011/0072886 A1 | 3/2011 | Caneau et al. | |
| 2012/0151994 A1 | 6/2012 | Hung et al. | |
| 2012/0272719 A1* | 11/2012 | Rezachek | G01N 29/2418 73/24.02 |
| 2017/0288125 A1 | 10/2017 | Glacer | |
| 2018/0136166 A1 | 5/2018 | Voinea | |
| 2018/0146512 A1 | 5/2018 | Pindl et al. | |
| 2019/0017966 A1 | 1/2019 | Csutak et al. | |
| 2019/0339193 A1* | 11/2019 | Eberl | G01N 29/14 |

OTHER PUBLICATIONS

Ababneh et al., "Electrical characterization of micromachined AlN resonators at various back pressures". Microsyst Technol, 2014, 20:63-670.

Pfusterschmied et al., "Temperature dependent performance of piezoelectric MEMS resonators for viscosity and density determination of liquids". Journal of Micromechanics and Microengineering, 25 (2015) 105014 (in 9 pages).

\* cited by examiner

PHOTOACOUSTIC SPECTROSCOPE HAVING A VIBRATING STRUCTURE AS SOUND DETECTOR

In a first aspect, the invention relates to a photoacoustic spectroscope for analyzing gas, comprising a modulatable infrared emitter, an analysis volume that can be filled with gas, and a sound pressure detector. The sound pressure detector comprises a structure capable of vibrating, an actuator, and a measuring unit, wherein the actuator is configured to actively excite vibration of the structure capable of vibrating and the measuring unit can measure the vibration properties of the structure capable of vibrating, which measurement depends on the formation of the sound pressure waves.

In a further aspect, the invention relates to a method for analyzing gas, comprising the provision of a photoacoustic spectroscope for analyzing gas, irradiating the gas with infrared radiation, modulated by a modulation frequency, to generate sound pressure waves, exciting the structure capable of vibrating at an excitation frequency, measuring the vibration properties of the structure capable of vibration, which measurement depends on the sound pressure, and determining the sound pressure of the gas based on the measured vibration properties.

BACKGROUND AND PRIOR ART

Photoacoustic spectroscopy (PAS) allows the detection of the finest concentrations of gases and has a plurality of applications. One example is the detection of $CO_2$, which plays a role in research and air conditioning. For example, the concentration of exhaust gases in the air can be measured in this way. Also relevant are military applications in which the smallest concentrations of poison gas can be detected.

In photoacoustic spectroscopy, intensity-modulated infrared radiation at frequencies in the absorption spectrum of a molecule to be detected in a gas is used. If this molecule is present in the beam path, modulated absorption takes place, which leads to heating and cooling processes, the time scales of which reflect the modulation frequency of the radiation. The heating and cooling processes cause the gas to expand and contract, causing sound waves at the modulation frequency. These can then be measured by sound detectors, such as microphones or flow sensors.

Various emitters are used as radiation sources for the applications mentioned, with different advantages and disadvantages. Infrared (IR) emitters are preferably used. For example, narrow-band laser sources in the infrared range can be used. These allow the use of high radiation intensities and can be modulated at high frequencies using standard components, e.g. for photoacoustic spectroscopy. However, due to the narrow spectrum of the laser, only precisely matching molecules can be detected based on the absorption spectrum. Lasers are also relatively expensive. If different molecules are to be detected, a corresponding number of lasers must be used.

Thermal, broadband emitters are known as well. These have the advantage of a broad spectrum, which can be further selected through the use of (tunable) filters, and often lower costs. However, the modulation frequency of these emitters is limited; direct modulation by varying the power supply is limited due to thermal time constants and is often in the range from a few Hz to approx. 100 Hz.

The inherent noise of the detection components in microphones is very high, particularly in this range from a few Hz to approx. 100 Hz, and leads to a reduced signal-to-noise ratio. The noise from the detectors can also be amplified by thermal signals from the emitter, which are registered directly as noise at the detector. Microsystem technology is used in many fields of application today to produce compact mechanical-electronic devices. The microsystems (microelectromechanical systems, MEMS) that can be produced in this way are very compact (micrometer range) with excellent functionality and ever lower manufacturing costs. Piezoelectric cantilevers are prior art, even if designed as MEMS. It is also known that pressures can be measured using piezoelectric cantilevers [1]. To this end, the damping of the cantilever in resonant operation is measured electrically, for example.

In the prior art, active excitation of sound transducers is sometimes described in order to improve signal quality.

US 2012/151994 A1 discloses a MEMS-based photoacoustic sensor having a laser diode as an IR emitter, which is directed at a resonance chamber filled with the analysis gas, the vibrations of which chamber are detected by means of a detector. US 2012/151994 A1 proposes to position a sound transducer, e.g. a MEMS microphone which is operated in an active resonance mode by means of a control circuit, in the vicinity (0.1-10 µm) of the resonance chamber. It is preferred here to bring the laser modulation and the excitation frequency of the sound transducer into harmony with the resonance frequency of the chamber. The detector, preferably a phase locked loop (PLL), detects a photoacoustic resonance as a change in the amplitude or frequency of the oscillator composed of the control circuit and the sound transducer.

US 2019/017966 A1 relates to a quartz enhanced photoacoustic spectroscope (QEPAS), preferably for use in boreholes, comprising a tunable laser which radiates into a sample chamber filled with the analysis gas. Inside the sample chamber, there is a quartz enhanced tuning fork (QTF) with which the generated sound waves can be detected. In one embodiment, the tuning fork (QTF) is actively operated with a periodic signal in order to increase the signal-to-noise ratio. For this purpose, the modulation frequency of the laser is matched to the resonance frequency of the tuning fork (QTF) or its subharmonic frequencies.

US 2011/072886 A1 discloses a photoacoustic spectroscope having a resonator in an analysis chamber onto which a laser radiates. The resulting sound waves are measured with a tuning fork, which partially protrudes into the inner cavity of the resonator. The tuning fork preferably comprises piezoelectric materials and high resonance frequencies in the kilohertz range. For increased sensitivity, it is preferred to tune the natural frequency of the resonator and the frequency of the laser modulation to these.

EP 2 543 987 A1 proposes a MEMS-based photoacoustic sensor which is formed on an SOI wafer and comprises a resonator capable of vibration. Laser light can be guided into the cavity of the sensor by means of an optical fiber to excite a gas located therein. The frequency of the laser light is adapted to the resonance frequency of the resonator. The resonator is preferably a piezoelectric beam, the vibration of which is detected by piezoelectric sensing strips.

In the aforementioned systems, oscillatory sound transducers at resonance frequencies in the kilohertz range are used, wherein the modulation of the IR emitter is matched to the resonance frequencies in order to increase the sensitivity. Therefore, lasers or laser diodes with a high modulation capability in the kilohertz range are preferably used as IR emitters. The influence of interference signals and noise in the low-frequency range are to be minimized by using high-frequency modulated IR emitters and, if necessary, actively excited sound transducers at high resonance frequencies.

The use of high-frequency structures capable of vibration which are excited in the kHz range, for example cantilevers, as detectors in PAS sensors with the simultaneous use of IR emitters with slow modulation capability, such as thermal IR emitters, has not yet been known.

Object of the Invention

It is the object of the invention to provide a photoacoustic spectroscope and a method for gas analysis without the disadvantages of the prior art. Particularly, it was an object of the invention to provide an improved photoacoustic spectroscope which has an improved accuracy and tolerance to noise and the option of measuring further measured variables and at the same time is characterized by a simple, inexpensive and compact structure.

SUMMARY OF THE INVENTION

This object is achieved by the features of the independent claims. Preferred embodiments are described in the dependent claims.

In a first aspect, the invention relates to a photoacoustic spectroscope for analyzing gas, comprising
  a modulatable infrared emitter,
  an analysis volume that can be filled with gas, and
  a sound pressure detector,
wherein the infrared emitter, the analysis volume, and the sound pressure detector are arranged such that the infrared radiation modulatably emittable from the infrared emitter can excite the gas in the analysis volume to form sound pressure waves which can be measured using the sound pressure detector, wherein the sound pressure detector comprises a structure capable of vibrating, an actuator, and a measuring unit, wherein the actuator is configured to actively excite vibration of the structure capable of vibrating and the measuring unit can measure the vibration properties of the structure capable of vibrating, which measurement depends on the formation of the sound pressure waves. The modulation frequency of the infrared emitter is preferably between 1 Hz and 200 Hz, while the excitation frequency of the structure capable of vibrating is between 1 kHz and 200 kHz.

The photoacoustic spectroscope according to the invention is characterized in that the sound pressure detector is actively excited to vibrate and vibrates at a significantly higher frequency than the sound pressure waves to be measured of the gas to be analyzed, wherein the vibration properties are also measured in the range of this higher frequency. The sound pressure detector is connected to the gas and its vibration properties, e.g. the vibration amplitude, the vibration frequency and/or the phase of the vibration in comparison to the periodic excitation influenced by the sound pressure waves of the gas. This influence is for example due to a changed damping of the structure excited to vibrate due to changing pressure conditions in the gas due to the sound pressure waves, which interact directly with the structure. This influence can be measured particularly well in the region of the resonance frequency of the vibrating structure, which is why it is preferably excited in a resonant or almost resonant manner.

Due to the fact that the measurement of the vibration properties and thus preferably the damping take place in a significantly higher frequency band than the preferred frequency range of the sound pressure waves, noise can be better suppressed than with conventional measurement methods, e.g. by using a microphone, since this noise preferably has a similar frequency range as the sound waves themselves. In addition, measuring techniques can be used that allow narrow-band filtering of the measurement signal and can therefore also suppress the noise. This is particularly true for thermal noise. Another advantage of the spectroscope and the sound pressure detector is that the pressure itself can be measured over time, and not just the pressure response of the gas excited by modulated IR radiation as in the prior art. In this way, additional information about the analyzed gas can be obtained, e.g. on its relaxation behavior after excitation of an acoustic vibration.

The basic features or essential components of a photoacoustic spectroscope for analyzing gas are known to a person skilled in the art. A modulatable emitter of electromagnetic radiation in the infrared wavelength range is preferably arranged and configured in such a way that infrared radiation emitted by the infrared emitter substantially or at least partially hits the gas to be analyzed in the analysis volume. If the modulated irradiation takes place at an infrared wavelength which corresponds to the absorption spectrum of a molecule in the gas, modulated absorption takes place, which leads to heating and cooling processes, the time scales of which reflect the modulation frequency of the radiation. According to the photoacoustic effect, the heating and cooling processes lead to expansion and contraction of the gas, whereby the gas can be excited to form sound pressure waves at substantially the modulation frequency. These can be measured by the sound detector. The power of the sound waves is preferably directly proportional to the concentration of the absorbing gas.

The sound waves are measured in the PAS of the prior art using microphones or other structures which can passively be caused to vibrate by the sound waves, e.g. membranes. This type of sound detector therefore substantially vibrates at the frequency of the sound generated. The sound pressure detector used here is also a structure capable of vibrating which, however, is actively caused to vibrate by an actuator, preferably through periodic excitation. The vibration frequency is preferably significantly above the frequency of the sound waves to be measured and preferably corresponds substantially to the excitation frequency. Particularly, the structure is excited in the range of its resonance frequency, wherein the structure preferably has a suitable resonance frequency as a result of the choice of material, dimensions, suspension and/or type of vibration excitation. An average person skilled in the art is aware of the interactions of the above and other properties of the structure on its resonance frequency or can calculate them, e.g. by simulations such as finite element methods (FEM).

The measuring unit preferably measures the vibration properties of the structure caused to vibrate, e.g. the vibration amplitude, vibration frequency, and/or the phase in comparison to the excitation of the structure capable of vibrating, preferably over time, e.g. by an impedance measurement if the structure comprises a material whose impedance has a dependency on one or more of the aforementioned vibration properties. The structure is preferably in direct interaction with a gas to be analyzed. If the gas is excited to vibrate by the modulated infrared radiation due to its absorption properties, which are preferably influenced by its composition, the sound pressure waves generated interact with the structure capable of vibrating, whereby the vibration properties, preferably its amplitude, frequency, and/or phase are influenced compared to the excitation (e.g. via the attenuation).

The gas to be analyzed is located in an analysis volume that can be filled with gas. This is preferably a volume that is at least partially closed or closable to the outside, in which the gas is located or into which it can be introduced, e.g. through a closable opening in the form of a closure and/or valve and/or through a supply line. Particularly, it is a completely closed or closable volume which has at least one, preferably two closable openings for introducing and/or discharging the gas to be analyzed. In this way, the gas to be analyzed can be localized very well, particularly in a beam range of the infrared radiation.

Furthermore, the exact composition and/or concentration of the gas can be maintained by means of a closed volume, and mixing with a gas surrounding the volume can be reduced. Enclosed volumes also offer the advantage of being better protected against interfering sound sources from outside and thus enable measurement with reduced errors. In this context, closed volume preferably means a volume, the contents of which substantially cannot mix with a gas of another volume outside of the analysis volume. Closed can preferably also relate to precisely controllable temperatures and/or pressures within the volume, which in addition are substantially independent of temperatures and/or pressures outside the analysis volume.

Another advantage of a closed or at least partially closed volume is that it can be designed particularly well for the generation and detection of the sound waves. For example, the volume can be constructed in such a manner that an acoustic resonance in the range of the modulation frequency and thus potential formation of sound pressure waves is supported, preferably by a volume in the form of a resonator. Likewise, the spatial arrangement of the volume and detector to one another can be configured such that the detector is arranged particularly favorably in relation to the sound waves of the gas that can be generated in the volume, e.g. in that the detector and sound waves, for example, have the largest possible common projection area and/or the detector is arranged close to a preferred area of origin of sound waves that can be generated by modulated infrared radiation.

The analysis volume can preferably also be at least partially open. As a result, particularly a gas atmosphere surrounding the spectroscope to which the analysis volume is at least partially open can be measured, and its composition can be checked. This is particularly interesting for applications in the field of pollutant measurement, but also e.g. for military applications or for counter-terrorism, e.g. by a poison gas attack. However, it is also advantageous in this case that the analysis volume is well defined, such that the infrared emitter, the analysis volume, and the sound detector are arranged in such a way that the infrared radiation that can be modulated by the infrared emitter can excite gas in the analysis volume to form sound pressure waves which can be measured using the sound pressure detector.

The infrared radiation through the infrared emitter is preferably directed from the outside onto a preferred region of the analysis volume. If it is necessary to radiate through an outer wall of the volume in order to excite a gas inside, this wall can preferably be substantially transparent to the IR radiation, at least in this region.

Terms such as 'substantially,' 'approximately,' 'about,' 'ca.,' etc. preferably describe a tolerance range of less than ±40%, preferably less than ±20%, particularly preferably less than ±10%, even more preferably less than ±5%, and particularly less than ±1%. The term 'similarly' preferably describes sizes that are approximately the same. 'Partially' describes preferably at least 5%, particularly preferably at least 10%, and particularly at least 20%, in some cases at least 40%. If it says above, for example, that a region is substantially transparent to an infrared beam, this means that the entire intensity of a beam or partial beam is allowed to pass through this region within the above-mentioned tolerance ranges.

The analysis volume can preferably be filled with gas. This means that there is a preferably closable opening for filling, even in the case of an at least partially closed or closable volume. Preferably, a gas flow can also be implemented in that the analysis volume has an inlet and an outlet, for example. Thus, either a continuous gas flow into the volume or a discontinuous gas flow can be implemented, wherein a filling or an exchange of the gas in the analysis volume can be performed during a filling or gas exchange phase. In an analysis phase, the gas flow is preferably interrupted, so that the PAS can take place. If different gases are to be analyzed at different times, this can preferably be achieved by such a structure. A cleaning gas for cleaning the volume of any gas residues can preferably be supplied between two gases to be analyzed.

In the case of an analysis volume which is at least partially open and thus preferably allows permanent gas exchange with an environment, the analysis volume is filled by interaction with a gas atmosphere in the environment.

An analysis volume can preferably comprise a sample chamber and a reference chamber, which are connected or can be connected by a connecting channel.

A modulatable infrared emitter preferably denotes a device which emits electromagnetic radiation. This radiation preferably has a wavelength range in the infrared (IR) range, particularly between approximately 700 nanometers (nm) and 1 millimeter (mm). The corresponding frequency of the emitted radiation can be in the range from approximately 300 gigahertz (GHz) to 400 terahertz (THz). The spectrum can also preferably be represented using the wave number $m^{-1}$ or $cm^{-1}$, as is customary in the field of spectroscopy. A person skilled in the art knows how to convert between these units. The spectrum is particularly selected so that it corresponds to the preferred field of application of the emitter, namely infrared spectroscopy and particularly photoacoustic spectroscopy. Particularly, the excitation of vibrations of the gas molecules to be spectroscopically analyzed and/or to be detected is preferred, which, depending on the gas molecules, match a preferred spectral range. For example, a spectral range of around 2.4 micrometers (µm) is suitable for the excitation of $CO_2$ molecules. Particularly preferred wavelength ranges of the infrared radiation are 700 nm to 10 µm, preferably 1 to 10 µm, particularly preferably 2 µm to 10 µm.

To generate the infrared radiation, thermal energy is preferably provided in the form of a heating element. A (micro) heating element is particularly preferred. A micro-heating element is preferably understood to mean a heating element with dimensions of the order of micrometers (µm). The heating element comprises a heatable layer made of a conductive material which produces Joule heat when an electrical current flows through it. The heat produced preferably shows a dependency on the ohmic resistance of the element and on the square of the amperage or on the square of the applied voltage and the inverse ohmic resistance, depending on whether a current or a voltage source is used. A thermal source of infrared radiation has advantageous properties for PAS, such as broadband emission through which a plurality of different gas atoms or molecules can be excited with just one light source. At the same time, a thermal IR emitter is particularly cost-effective, easy to manufacture, and has a long service life.

In a state of equilibrium, the heat produced is equal to the heat losses through heat conduction, convection, and heat radiation (synonymous: thermal radiation, infrared radiation) which is given off at the outer interfaces of the heatable layer through which current flows. As is known to a person skilled in the art, the heat produced causes thermal radiation, among other things, particularly through thermal movement of particles which results in an acceleration of charge carriers and/or vibrating dipole moments, for example. In this way, infrared radiation can be generated in a targeted manner by a heatable layer through which current flows. The heatable layer is preferably made of metal, such as tungsten or platinum. Applying a suitable voltage and the resulting current flow generates Joule heat and thus ultimately infrared radiation.

The radiation spectrum of a heated body can be preferably approximated by Planck's radiation law, wherein a person skilled in the art is aware about the differences of a real heatable layer compared to a black body, such as the emissivity or the real deviation from a thermal Equilibrium of the body. Despite these deviations, the generated spectrum and its intensity are substantially described by the temperature and the radiating surface in accordance with Planck's law of radiation.

Thus, a person skilled in the art can achieve a preferred spectrum with a preferred intensity distribution through targeted design of the (micro) heating element. In addition to the material and the geometric configuration of the heating element, the electrical energy made available and the size of the heat losses of the heating element in addition to the thermal radiation are preferably decisive. The size of these heat losses is determined, for example, by the thermal conductivity between the heating element and the adjacent materials and/or fluids as well as their heat capacity and the size of the interface(s).

An IR emitter in the form of a heating element is particularly cost-effective and robust; at the same time, due to the spectral width of the emission, a large number of gas molecules can be detected in the PSA. Narrower spectra can preferably be selected from the broad emission spectrum, if required, by means of a preferably tunable bandpass filter. The infrared radiation can preferably also be generated by a light-emitting diode (LED) emitting in the desired infrared spectral range and/or a laser. Particularly a laser preferably has a narrow emission spectrum, such that preferably only absorption lines of gas atoms or molecules that fit exactly to this spectrum can be excited and thus detected. A laser is therefore advantageous if only specific gas molecules are to be detected, wherein the significance of the detection with regard to the presence of these molecules is particularly high since other molecules, preferably with a high degree of certainty, cannot be excited by the narrow spectrum of the laser.

The emission of the IR emitter is preferably a beam which is oriented in a preferred direction in the form of a straight line. Below, the term beam is intended to describe the preferably bundled part of the radiation along the preferred beam direction of the emitter, which is emitted by the emitter, wherein particularly the areas of greatest intensity along this direction define the beam. Intensity is preferably defined as surface power density and preferably has the unit watts per square meter or, for short, $W/m^2$.

Additional components such as lenses, which ensure a bundling or collimation of the beam, may be integrated in the emitter or attached externally. A person skilled in the art knows how to shape the emission profile of the radiation source through the design of the IR emitter and through the use of further components, such that a desired beam profile and a desired beam direction result. The modulatable IR emitter can preferably do without additional lenses, or be present as a system comprising a radiation source and at least one lens for collimating the beam.

The emitter may be modulatable, which means that the intensity of the emitted radiation, preferably the intensity of the beam, can be changed in a controllable manner over time.

The modulation should preferably bring about a change in intensity over time as a measurable variable. This means for example that the intensity over time between the weakest intensity measured within the measurement period and the strongest intensity measured within the same period of time is greater than the sensitivity of a device typically used for the radiation spectrum and the application to measure or determine the intensity. The difference is preferably significantly greater than a factor of 2, more preferably of 4, 6, or 8 between the strongest and the weakest adjustable intensity. It is particularly preferred if the intensity of the modulated beam is modulated for one or more predetermined resonance wavelengths.

Preferably, particularly in the case of a thermal emitter, direct modulation can be carried out by varying the power supply. This is also particularly easy and inexpensive to implement.

In known photoacoustic spectroscopes, the disadvantage of using IR emitters with heating elements is their slow modulation capability. This is because such a modulation is usually limited to a specific range of a modulation spectrum due to thermal time constants, e.g. in an order of magnitude of up to 100 Hz. In the prior art, slow modulation was often associated with a poor signal-to-noise ratio due to the inherent noise of the detection components. This disadvantage can be eliminated in the present invention because the sound pressure detector represents a structure capable of vibrating which, with the aid of an actuator, is actively excited to vibrate at preferably significantly higher frequencies. The actual detection of the sound pressure waves for the PAS comes from a modulation of this vibration due to the influence of the sound pressure waves on the vibration properties of the structure, for example, the damping. Although the sound pressure waves themselves thus have a low frequency due to the modulation frequency of the IR emitter, the actual detection of the vibration properties of the structure, which is influenced by the sound pressure waves, instead takes place at the higher vibration frequencies of the structure and thus substantially outside the frequency range of typical detector noise. The active excitation of the structure capable of vibrating provided according to the invention advantageously makes it possible to achieve a significantly improved signal-to-noise ratio, even when using slowly modulatable IR emitters. This allows the provision of cost-effective, compact MEMS-based PAS with an excellent detection quality.

The infrared emitter can preferably also be modulated by external modulation, e.g. by using a spinning chopper wheel and/or an electro-optical modulator. In this case as well, there is advantageously no need for high-frequency modulation in the kilohertz range to ensure a good signal-to-noise ratio.

The sound pressure detector comprises a structure capable of vibrating, e.g. a vibratory and/or vibratorily mounted membrane, a vibratory and/or vibratorily mounted valve, and/or a vibratorily mounted cantilever or bending beam. In this context, 'capable of vibrating' means particularly that the structure can be excited to mechanical vibration over a long period of time by a suitable drive in the form of an actuator, without structural changes (damage) to the structure.

The vibration can comprise a simple vibration substantially along a spatial dimension and/or about a one-dimensional axis, but it can also be a more complex, spatially multidimensional vibration or vibration mode. At the same time, the vibrations should preferably be large enough that they or their properties can be measured by a measuring unit. This particularly means that a measurable and electronically processable electrical signal can be generated from the measurement of the vibration, which signal can advantageously contain information about the vibration and its properties, such as vibration amplitude, vibration frequency, phase of the vibration, preferably compared to a reference signal and/or vibration intensity.

The frequency of the vibration is preferably well-defined in a range between 1 Hz and 100 kHz; particularly, the vibration has a frequency which differs significantly from other frequencies of other essential processes that may occur in the spectroscope, e.g. of known (thermal) noise processes and/or modulation frequencies of the IR radiation. Particularly the vibration frequency is significantly higher than these frequencies. The vibration preferably has an substantially constant vibration frequency or a narrow vibration spectrum.

Vibration is preferably understood to be a repeated temporal fluctuation from the spatial deflection of the structure or regions of the structure. Particularly, the vibration is substantially or at least partially periodic, which above all means it is regular over time. Periodic vibrations, especially if considered over several periods, can preferably be described by the vibration mode of the vibration. The vibration mode is preferably a form of description of specific properties of a vibration that are stationary over time. Different vibration modes differ particularly in the spatial distribution of the vibration intensity, wherein the shape of the vibration modes is preferably determined by boundary conditions under which the vibration propagates. These boundary conditions can be set by the material, the dimensions, and/or the mounting of the structure capable of vibrating and at least one force vector acting on the structure (preferably comprising the nominal size and/or the direction of the acting force).

In the case of a vibrating cantilever, there may be several bending vibration modes in which the cantilever sags along a preferred direction, e.g. perpendicular to a plane of the suspension of the cantilever, which can particularly differ in the vibration frequency, the maximum vibration amplitude, and in its spatial occurrence. A bending vibration mode is particularly characterized in that the vibration includes a dynamic bending process in the direction substantially of a normal to a main plane of the cantilever or the structure capable of vibrating. However, there can also be other modes of vibration, such as a torsion mode, which describes a vibration in the form of a periodic torsional movement of the structure along an axis. More complex modes and/or modes that represent superimpositions of other modes are also possible. A vibration preferably takes place in a vibration mode. An example of a complex vibration mode is the roof tile-shaped vibration mode, e.g. of a cantilever, in which the cantilever swings back and forth between roof tile-like deformation states.

In addition to the structure, the actuator must also be suitable for exciting such vibrations, since it is configured to actively excite vibrations in the structure. The actuator is preferably intended to excite a forced vibration in the structure capable of vibration. The actuator must be capable of transmitting a force generated by it to the structure, e.g. by communicating with the structure in a manner that enables force transmission. The structure can preferably also at least partially include the actuator. The force itself must be suitable to trigger the vibrations, which particularly means that the force is periodic and preferably has substantially the frequency of the vibrations of the structure to be generated and is suitable for causing the structure to vibrate, preferably in a vibration mode.

A person skilled in the art is familiar with the sometimes complex interactions between a vibrating structure and a drive of the forced vibration, which preferably results from, among other things, resonance frequencies (or natural frequencies) of the structure, damping properties of the structure and the fluid (gas) in its environment, and the size and direction of the driving force over time, and can be locally different within the structure. An easy-to-describe, periodic force action along one direction can also generate significantly more complex vibration patterns than would be expected without taking these interactions into account.

It can be preferred in this case that the structure has elastic properties which support vibrations particularly along at least one direction and/or at least at one location or region of the structure. These elastic properties can preferably be described by at least one spring constant. The structure preferably also has a mass which co-determines the vibration properties. It can be the case, for example, that the actuator only generates a periodic active force for a deflection in one direction and the structure causes the deflection in the opposite direction due to its restoring force, from which forces overall the vibration arises. Preferably, an actuator particularly converts an electrical control signal into a movement. An actuator can e.g. be a piezoelectric actuator and generate a periodic force to excite vibrations due to the piezoelectric effect when an electrical control signal in the form of an electrical voltage, for example, is periodically applied to the actuator. The actuator can preferably be an external element which mechanically transmits an excitation force to the structure; but the actuator may also be integral to the structure and generate the force for mechanical vibration excitation within this structure, for example.

The measuring unit is preferably suitable for measuring the vibration properties and particularly for measuring a time profile of the vibration properties. Information can preferably be extracted from these vibration properties of the structure or their time profile, which preferably also allows statements about the properties of the gas surrounding the structure. These vibration properties preferably relate to the vibration amplitude, the vibration frequency, the vibration mode, the vibration phase (e.g. compared to the periodic excitation force applied by the actuator), the vibration intensity, the damping of the vibration, etc. However, it is particularly preferred that the damping properties can be determined from the (other) vibration properties, since the damping properties include, in addition to a damping component inherent in the structure (and preferably constant or known and/or calculable), an external damping component, which occurs particularly by an interaction of the structure with the ambient gas and above all with the pressure of the ambient gas. This component is mainly mediated by collisions of the gas molecules with the structure, wherein the pressure (force per area) on the structure caused by the collisions depends on the pressure of the gas.

Since the structure is preferably present within or on the analysis volume and interacts (directly) with a gas to be analyzed which has been filled into the analysis volume, information about the gas itself, particularly about its pressure, can be obtained in this way. For example, for a gas that absorbs the modulated IR radiation and therefore generates sound pressure waves, information about the sound pressure waves and their amplitude over time can be obtained, which, as an average person skilled in PAS knows, allow conclusions about the composition of the gas, such as the presence of specific gas molecules and their concentration within the volume.

It is particularly preferred that the damping of the structure, particularly through interaction with the gas to be analyzed, and its time curve can be determined by measuring the vibration properties, vibration amplitude, vibration frequency, and/or vibration phase of the structure compared to the periodic excitation, particularly over time. The interaction particularly comes about through collisions between the structure and the gas molecules. The strength and/or frequency of the impacts depends on the pressure of the gas. If the absorption of modulated IR radiation causes the PAS molecules to vibrate, and sound pressure waves are thus preferably generated in the analysis volume, these sound pressure waves preferably transmit a pressure proportional to the waves onto the structure and thus influence the vibration properties and/or their damping. This effect can preferably be measured when measuring the vibration amplitude, vibration intensity, vibration phase in relation to the periodic excitation and/or vibration frequency, particularly over time. For example, a superposition of the (preferably fast) active vibration of the structure with the pressure waves acting on the structure (which preferably vibrate more slowly) can influence the vibration amplitude and/or vibration intensity in that an envelope of the vibration amplitude of the vibration of the structure, which at least partially follows the pressure profile, is caused over time, particularly by the varying damping due to the pressure fluctuations.

Likewise, a damping varied by the sound pressure waves can preferably generate a phase change in the vibration of the structure with respect to the excitation frequency, which can also be measured, e.g. by measuring the vibration amplitude of the structure over time and comparing it to the preferably periodic input signal or control signal of the actuator for periodic excitation of the structure.

A measurement is particularly preferred in the frequency range of resonant vibrations of the structure. It can for example be preferred that the resonance frequency is shifted by the preferably varying damping due to the sound pressure waves of the gas. This can for example be measured in that the vibration amplitude of the structure is measured and at the same time the frequency of the periodic excitation is tuned by the actuator in a frequency range, e.g. in the range of a natural frequency of the structure. The resonance frequency of the overall vibrating system can thus preferably be measured by measuring the vibration amplitude, wherein the vibration amplitude preferably is at a maximum in the region of resonance. The resonance frequency of the overall system is preferably shifted by varying the damping compared to the system with constant damping. Measuring the shift or the time profile of the shift for example allows to draw conclusions about the sound pressure waves.

The vibration properties of the structure capable of vibration preferably include the vibration amplitude The vibration amplitude preferably depends on the formation of the sound pressure waves in the analysis volume. The sound pressure waves in the analysis volume particularly influence the damping of the structure capable of vibrating (in a known, measurable and/or calculable manner), wherein the damping influences the vibration amplitude. Since the influence of the damping on the vibration amplitude is advantageously also known, calculable and/or measurable, conclusions can be drawn from their measurement with respect to the sound pressure waves and thus about the gas and its composition. Particularly, conclusions can be drawn about the properties of the sound pressure waves. It can also be preferred that a direct relationship between sound pressure waves and vibration amplitude is known, calculable and/or measurable, and thus the properties of the sound pressure waves can be inferred directly from a measurement of the vibration amplitude.

The properties of the sound pressure waves preferably include the at least one vibration frequency of the sound pressure wave, the amplitude of the sound pressure wave, the phase of the sound pressure wave in relation to the periodic modulation of the stimulating IR radiation, the vibration intensity of the sound pressure wave, as well as preferably the properties mentioned over time, whereby e.g. a decay of the sound pressure wave is included. The vibration amplitude of the structure can preferably be measured by measuring the deflection of the structure at least at one location and/or at least one region of the structure.

The vibration properties of the structure capable of vibration preferably include the vibration frequency. The vibration frequency preferably depends on the formation of the sound pressure waves in the analysis volume. The sound pressure waves in the analysis volume particularly influence the damping of the structure capable of vibrating (in a known, measurable and/or calculable manner), wherein the damping influences the vibration frequency. Since the influence of the damping on the vibration amplitude is advantageously also known, calculable and/or measurable, conclusions can be drawn from its measurement with respect to the sound pressure waves and thus to the gas and its composition. Particularly, conclusions can be drawn about the properties of the sound pressure waves. It can also be preferred that a direct relationship between sound pressure waves and vibration frequency is known, calculable and/or measurable, and thus the properties of the sound pressure waves can be inferred directly from a measurement of the vibration amplitude.

The vibration frequency of the structure is preferably measured by measuring the deflection of the structure at least at one location and/or at least of a region of the structure, wherein consideration of the deflection over at least one vibration period, preferably a plurality of vibration periods, in a way known to a person skilled in the art provides information about the vibration frequency of the structure capable of vibrating.

The vibration properties of the structure capable of vibration preferably include at least one resonant vibration frequency or resonance frequency wo of the structure. It can be preferred that the structure has several resonance frequencies for preferably multiple vibration modes. The resonance frequency preferably depends on the formation of the sound pressure waves in the analysis volume. The sound pressure waves in the analysis volume particularly influence the damping of the structure capable of vibrating (in a known, measurable and/or calculable manner), wherein the damping influences the resonance frequency. Since the influence of the damping on the resonance frequency is advantageously also known, calculable and/or measurable, conclusions can be drawn from its measurement with respect to the sound pressure waves and thus to the gas and its composition. Particularly, conclusions can be drawn about the properties of the sound pressure waves. It can also be preferred that a direct relationship between sound pressure waves and vibration amplitude is known, calculable and/or measurable, and thus the properties of the sound pressure waves can be inferred directly from a measurement of the resonance frequency.

The resonance frequency of the structure is preferably measured by measuring the deflection of the structure at least at one location and/or at least of a region of the structure, wherein consideration of the deflection over at least one vibration period, preferably a plurality of vibration periods, in a way known to a person skilled in the art provides information about the current vibration frequency of the structure capable of vibrating. In this case, that frequency is preferably recognized as the resonance frequency which has a maximum deflection or vibration amplitude. In this case, different excitation frequencies are preferably set by the actuator within at least one frequency range in order to measure or detect the resonance frequency.

The vibration properties of the structure capable of vibrating preferably include the vibration phase compared to the (periodic) excitation of the structure by the actuator. The vibration phase preferably describes the vibration phase compared to the (periodic) excitation of the structure. The vibration phase preferably depends on the formation of the sound pressure waves in the analysis volume. The sound pressure waves in the analysis volume particularly influence the damping of the structure capable of vibrating (in a known, measurable and/or calculable manner), wherein the damping influences the vibration phase compared to periodic excitation. Since the influence of the damping on the vibration phase is advantageously also known, calculable and/or measurable, conclusions can be drawn from its measurement with respect to the sound pressure waves and thus to the gas and its composition. Particularly, conclusions can be drawn about the properties of the sound pressure waves. It can also be preferred that a direct relationship between sound pressure waves and vibration phase is known, calculable and/or measurable, and thus the properties of the sound pressure waves can be inferred directly from a measurement of the vibration amplitude.

The vibration phase of the structure is preferably measured by measuring the deflection of the structure at least at one location and/or at least of a region, wherein consideration of the deflection over at least one vibration period, preferably a plurality of vibration periods, and comparison to the time profile of the excitation frequency in a way known to a person skilled in the art, provides information about the vibration frequency of the structure capable of vibrating.

The vibration properties of the structure capable of vibrating preferably include the damping of the vibration of the structure, particularly the part of the damping influenced by the sound pressure waves. The term attenuation particularly describes the part of the attenuation influenced by the sound pressure waves. The attenuation preferably depends in a known, measurable, and/or calculable manner on the formation of the sound pressure waves in the analysis volume. Therefore, conclusions can advantageously be drawn from measuring the damping with respect to the sound pressure waves and thus to the gas and its composition. Particularly, conclusions can be drawn about the properties of the sound pressure waves. The damping of the structure can preferably be measured by measuring the deflection of the structure at least at one location and/or at least one region and comparing this to a measurement of a deflection or vibration not dampened by sound pressure waves.

The vibration properties of the structure capable of vibrating preferably include the quality factor and/or Q-factor of the vibration of the structure. This is preferably measured by measuring the resonance frequency and the half-width of the resonance $\Delta\omega$ and is particularly $Q=\omega_0/\Delta\omega$, wherein the half-width is preferably defined as the frequency spacing between the two frequencies at which the vibration amplitude is $1/\sqrt{2}$ of the maximum vibration amplitude (in resonance), or where the vibration intensity is half of the maximum vibration intensity (in resonance). The quality factor preferably depends in a known, measurable, and/or calculable manner on the formation of the sound pressure waves in the analysis volume. Therefore, conclusions can advantageously be drawn from measuring the quality factor with respect to the sound pressure waves and thus to the gas and its composition. Particularly, conclusions can be drawn about the properties of the sound pressure waves.

The vibration properties of the structure capable of vibrating depend particularly on the formation of the sound pressure waves, which preferably means that the properties of the sound pressure waves can be measured by measuring the vibration properties. The properties of the sound pressure waves include particularly the frequency, amplitude, intensity, and/or phase in relation to the modulated IR excitation of the sound pressure waves, preferably over time. Particularly, a measurement of the vibration properties enables a measurement of the gas composition (with absorption of the IR radiation) of the gas in the analysis volume (or in the sample volume), as is customary with PAS.

Preferably, the vibration properties, particularly the vibration properties mentioned above, can also be measured over time and e.g. include a time series (chronologically ordered according to the time of measurement) of the measurements of the properties at the time of the respective measurement. The time profile of the vibration properties can preferably be used to draw conclusions about other properties of the analyzed gas, such as a decay behavior of the sound waves after excitation by IR radiation.

Measuring the vibration properties, not only allows a statement about the properties of the sound pressure waves, but also about a constant pressure without the presence of sound pressure waves due to modulated absorption of gas molecules. Particularly, the transient behavior at the onset of absorption and/or the relaxation behavior after modulated absorption can be measured.

The vibration properties can preferably be measured by lock-in technique using a lock-in amplifier. Since particularly the measurement of the vibration properties is preferably carried out substantially at the frequency of the excitation of the structure capable of vibrating or the measurement signal is modulated by the frequency of the excitation, a narrow-band bandpass filter can be applied to the measurement using a lock-in amplifier or lock-in technique, and in this way noise, particularly thermal noise, can be minimized. It can also be preferred to use the described lock-in technique to filter out only signals in the range of the modulation frequency of the modulated IR radiation in a narrow band and in this way to minimize the noise of the measurement.

Preferably, information about the density and/or viscosity of the gas can also be obtained directly through the interaction of the vibrating structure capable of vibrating with the gas and thus advantageously together with the sound pressure waves generated by the PAS, and thus provide an even more comprehensive picture of the composition of the gas in the analysis volume, particularly in the sample volume, and/or increase the precision of the PAS, preferably synergistically [2].

A preferred photoacoustic spectroscope according to this description can be designed very compact and robust in its design due to the simplicity and miniaturization capability of the components and e.g. be integrated or integrable in a smartphone or other portable device.

The inventive spectroscope offers the particular advantage of decoupling the excitation frequencies of the modulated IR radiation from a measurement frequency by the sound pressure detector, in that the sound pressure detector comprises a structure capable of vibrating actively excited by the actuator and a measurement of sound pressure waves generated by the measurement unit also included at this frequency of the structure capable of vibrating. This frequency can preferably be higher than the frequency of the modulated IR radiation and the sound pressure waves to be detected, whereby particularly specific noise sources can be reduced and/or excluded when the sound is detected, which are at the (preferably lower) frequency of the sound pressure waves and/or caused by the modulated IR radiation itself. Exemplary noise that can be reduced is thermal noise, 1/f noise, and/or $1/f^2$ noise.

In a preferred embodiment of the invention, the spectroscope comprises a control unit which is configured to excite the structure capable of vibrating to vibrate using an excitation frequency and to control the modulatable infrared emitter in such a manner that it emits infrared radiation modulated with a modulation frequency, wherein the modulation frequency of the infrared emitter is smaller than the excitation frequency of the vibratory system by a factor of 2, preferably 5, 10 or more. The modulation frequency of the infrared emitter is preferably between 1 Hz and 200 Hz, while the excitation frequency of the structure capable of vibrating is more than 1 kHz, preferably between 1 kHz and 200 kHz. A control unit is preferably suitable for outputting electrical control signals which, on the one hand, actuate the actuator and, on the other hand, actuate the modulatable infrared emitter. The control unit can preferably have at least two signal outputs for this purpose, wherein one output is preferably connected to a signal input of the actuator and another output to a signal input of the infrared emitter. The signals output here are preferably called actuating signals or control signals. The signal present at the signal input of the actuator should preferably be designed in such a way that the actuator excites the structure capable of vibrating to vibrate using an excitation frequency. For this purpose, the signal from the control unit is adjusted over time, e.g. with respect to an amplitude and a waveform of the electrical voltage.

It is preferably a periodic signal having a frequency which substantially corresponds to the excitation frequency. Analogously, the signal from the control unit, which is applied to the signal input of the IR emitter, is adjusted overtime, e.g. with respect to an amplitude and a waveform preferably of the electrical voltage to generate an emitted IR radiation with the modulation frequency. It is preferably a periodic signal having a frequency which substantially corresponds to the modulation frequency. But the frequencies of the two signals preferably differ. Particularly, the modulation frequency of the infrared emitter is preferably smaller than the excitation frequency of the vibratory system by a factor of 2, preferably 5, 10 or more. The signal for the modulation frequency can preferably be derived from the signal for the excitation frequency, e.g. by a frequency divider applied to the signal of the excitation frequency and/or by further signal processing. This preferably takes place in the control unit.

However, both signals can preferably also be generated separately from one another. Particularly, it can be preferred to additionally modulate the signal for the modulation frequency in a specific way in order to increase later detectability when a sound pressure wave is detected. If the excitation frequency is an integer multiple of the modulation frequency, it can also be preferred that the control unit generates a fixed but adjustable phase shift between the two signals. The control unit preferably has at least one input via which external commands can be transmitted to the control unit for setting the output signals. A control unit is preferably at least one integrated circuit which can receive and/or generate digital and/or analog electrical signals, preferably for the aforementioned purposes. The control signals are preferably analog signals which can be adjusted with regard to the signal properties (amplitude, frequency, phase, preferably over time) for optimizing the PAS. The control unit is preferably at least one computer, a microprocessor, a field programmable gate array (FPGA) and/or some other electronic circuit and may for example include: digital-to-analog converters, analog-to-digital converters, memories and/or (signal) amplifiers.

If a modulation frequency of the infrared emitter is smaller than the excitation frequency of the structure capable of vibrating by a factor of 2, preferably 5, 10, or more, the sound pressure waves, which substantially have the modulation frequency, can preferably be measured substantially in the range of the excitation frequency. The measurement signal caused by the sound pressure waves can preferably be modulated with the signal of the excitation frequency, since this substantially corresponds to the frequency of the structure capable of vibrating upon excitation. As a result, noise in the range of low frequencies and particularly in the range of the modulation frequency can advantageously be excluded and/or filtered, and the PAS can be improved. Another disadvantage of the prior art PAS is that the modulated infrared radiation itself can generate a (noise) signal at the sound detector. Since the measurement in this case takes place at frequencies that are approximately at least by a factor of 2 higher, particularly this interference source can be filtered out and/or excluded from the measurements. As a result, an improvement of the measurement can be achieved within a specific ratio between the two frequencies, preferably with an increase in the factor.

In a preferred embodiment, the modulation frequency of the infrared emitter is preferably between 1 Hz and 200 Hz, while the excitation frequency of the structure capable of vibrating is between 1 kHz and 200 kHz. These frequencies have proven to be particularly effective in ensuring a high signal-to-noise ratio. In addition, these modulation frequencies are particularly suitable for implementing a cost-effective, electrically modulated thermal IR emitter, which, due to thermal inertia, is preferably limited to a range of modulation frequencies of this order of magnitude. On the other hand, a mechanically vibrating structure driven by an actuator at these excitation frequencies can be implemented in a particularly simple, robust, and cost-effective manner.

In this embodiment, it is preferred that the control unit is suitable for generating electronic control signals of these two orders of magnitude. The control unit should therefore preferably have a suitable electrical bandwidth within the respective frequency ranges. The infrared emitter or, if present, an external modulator, should preferably be suitable for modulating the infrared radiation at this frequency.

Similarly, the actuator must be suitable to excite the structure capable of vibrating at these frequencies, and the structure itself must be suitable to vibrate in at least one vibration mode at least at one of these frequencies. The structure preferably has a resonance frequency in at least one vibration mode at least at one frequency within the preferred frequency range.

In a preferred embodiment of the invention, the excitation frequency of the structure capable of vibrating corresponds to a resonance frequency of the structure capable of vibrating. As already described above, operation of the structure capable of vibrating in a range of or at the resonance frequency is particularly well suited for measuring the sound pressure waves or their properties. Particularly, the vibration amplitude of the respective vibration mode is preferably in maximum resonance, whereby the measurement of the vibration properties can preferably be improved.

In another preferred embodiment of the invention, the spectroscope comprises an array of sound pressure detectors. An array of sound pressure detectors preferably comprises multiple sound pressure detectors, e.g. 2, 3, 4, 5, 10, 20, or 50 sound pressure detectors, which are spatially arranged to each other. Particularly, such an array comprises multiple structures capable of vibrating which can be excited by at least one actuator and whose vibration properties can be measured by at least one measuring device. Particularly preferably, each structure that can vibrate has its own actuator and/or its own measuring device. An arrangement can preferably be in the form of a matrix of several rows (detectors arranged horizontally along a line) and/or columns (detectors arranged vertically along a line) of sound pressure detectors. This is how a spatially resolved measurement of sound pressure waves can advantageously be carried out. Thus, additional information about the spatial distribution of a gas to be measured can be obtained, for example.

In the case of an embodiment of an analysis volume which has a sample chamber and a reference chamber (see below), it can be preferred to have at least one sound pressure detector in each chamber for measuring separately in each chamber and thus be able to preferably exclude sources of interference, e.g. external sound pressure waves which do not come from the IR radiation absorbed in the sample chamber, after the measurement. In the case of an array of sound pressure detectors, each detector can preferably have different vibration properties, particularly even without the action of sound pressure waves. The structures themselves can have different properties and/or can be excited in different ways (amplitude, frequency, phase). A preferred embodiment of an array can for example comprise multiple sound pressure detectors, particularly multiple structures capable of vibrating which are arranged, for example, in a matrix layout (e.g. in an area of 9 mm×9 mm) enclosed in a circuit board-compatible housing according to a standard electronic component, e.g. in 24-pin DIP (dual inline package) construction [2].

In another preferred embodiment of the invention, the actuator is a MEMS actuator, preferably selected from the group comprising electrostatic actuators, piezoelectric actuators, electromagnetic actuators and/or thermal actuators. A MEMS actuator preferably is an actuator which is produced using conventional production methods of microsystem technology and which also advantageously has dimensions of the order of microns. Such an actuator is particularly compact, robust, and low-maintenance and can be produced simply and cost-effectively. Particularly, the structure capable of vibrating, which is excited to vibrate by the actuator, can also be a MEMS element, that is to say, preferably, that the structure and actuator can preferably be produced in one manufacturing step with the MEMS actuator and are compact. It is desirable that parts of the same substrate can be used for production. This simplifies the production and makes it cheaper.

The aforementioned actuators are particularly well suited for exciting a large number of rapid vibrations and have a low energy requirement, particularly due to their compact design. The range of vibrations that can be achieved is also advantageously very high due to the compact design and the low inertia values.

In another preferred embodiment of the invention, the structure capable of vibrating comprises a bending beam, a valve, and/or a membrane.

The structure capable of vibrating is preferably mounted such that it can vibrate and/or is designed to be able to vibrate at the desired frequencies depending on the thickness and/or the choice of material. This applies particularly to the above-mentioned embodiments of the structure that can vibrate. The structure capable of vibrating, particularly the bending beam, membrane, and/or valve, is particularly present on an outer boundary surface of the analysis volume and/or the sample chamber. It can be particularly advantageous for the structure capable of vibrating to be arranged within a connecting channel between the sample chamber and the reference chamber, as described below. In this case, the structure capable of vibrating particularly forms or comprises a partition between the two chambers which is at least partially or substantially pressure-tight.

A cantilever, or synonymously, a bending beam is preferably a spatially extended, particularly elongated element, which is mounted for vibrating along at least one side and is otherwise preferably detached. A cantilever can for example have the shape of a flat, elongated cuboid, the thickness of which is significantly smaller compared to the transverse and longitudinal extension, wherein the transverse extension is preferably smaller than the longitudinal extension.

However, a bending beam mounted so as to be swingable on both sides or on multiple sides can also be preferred.

A membrane is preferably a thin, flat structure with a substantially round and/or polygonal circumference, for example. The membrane is preferably mounted such that it can vibrate at least in some areas along one of the circumference. A membrane can preferably be substantially pressure-tight with respect to a gas in the analysis chamber. If the membrane is present at an outer boundary surface of the analysis chamber and/or sample chamber, the membrane can preferably likewise be pressure-tight against a gas which is present on another side of the membrane.

A valve is particularly a component for shutting off or controlling the flow of fluids, above all, gases. A closure part (e.g. plate, cone, ball, membrane, and/or needle) is preferably moved approximately parallel to the direction of flow of the fluid and, depending on the positioning, may or may not allow at least a partial flow. The flow is interrupted, for example, by pressing the closure part with a sealing surface against a suitably shaped edge area of an opening. A valve can preferably be configured in such a way that if the pressure is above a threshold value on at least one side of the valve, the valve is at least partially opened by the pressure and an at least partial flow of a gas, preferably in the direction of the decreasing pressure, is enabled. A valve is advantageously located on an outer region of the analysis volume and/or the sample chamber, e.g. in a connecting channel, and is arranged such that it can be moved or caused to vibrate by sound pressure waves caused by the modulated IR radiation.

In another preferred embodiment of the invention, the sound pressure detector comprises a piezoelectric beam, which is preferably arranged as a cantilever in the analysis volume. A piezoelectric beam is preferably a bending beam which comprises a piezoelectric actuator. This means particularly that the bending beam comprises at least one piezoelectric material which, due to its properties and/or arrangement within the cantilever, with suitable electrical actuation by an electrical control signal, enables a piezoelectrically excited vibration controlled by this signal in order to enable the sound pressure detector as described herein.

The piezoelectric beam preferably has at least one contact for control by the electrical control signal, particularly in the form of at least one electrode to which an electrical control signal is applied. Particularly, a piezoelectric beam has at least two electrodes. The average person skilled in the art knows how a piezoelectric actuator which generates the desired vibration properties of the actively excited bending beam can be provided, e.g. by suitable material selection, suitable arrangement of the material, and/or suitable electrical actuation by an electrical control signal. A cantilever chair is particularly a bending beam that is mounted for swinging on one side and is otherwise detached.

A piezoelectric material is preferably a material which is suitable for exhibiting a piezoelectric effect. The piezoelectric effect preferably describes the deformation of a material when an electrical voltage and/or an electrical field is applied (inverse piezo effect), as a result of which a force can be exerted, particularly by the material. The piezoelectric effect also preferably describes the change in the electrical polarization and thus preferably the occurrence of an electrical voltage and/or a change in impedance on a solid body when it is elastically deformed (direct piezo effect).

The deformation of a piezoelectric structure preferably depends particularly on the electrical polarization within the structure and can preferably be influenced, inter alia, by the arrangement of the electrodes. In this way, the vibration mode of the structure can preferably be influenced.

The bar can preferably be a unimorphic or monomorphic cantilever, which preferably comprises an active layer and an inactive or passive layer. In this case, an active layer preferably denotes a piezoelectric layer in which a force or a deformation is triggered by an applied electric field, particularly by applying an electric control voltage. This force or deformation preferably generates bending and/or deformation of the beam, which can preferably trigger an active vibration by means of a periodic electrical control signal. The inactive layer preferably comprises a non-piezoelectric material. It is preferred that the active layer and the inactive layer interact in such a manner that a resultant force is generated due to the applied control voltage, which causes a deflection of the bar, which preferably causes a vibration when the electrical signal is periodic. It may also be preferred that the inactive layer also comprises a piezoelectric material, which, however, is not electrically contacted and/or actuated by a control signal, to which advantageously no electrical control signal is applied, and which particularly does not experience an external electrical field, which triggers an internal force and/or a deformation due to the indirect piezoelectric effect of the inactive layer.

Likewise, the cantilever can preferably be a bimorphic cantilever, which preferably comprises at least two active layers. An inactive layer can preferably be present between the at least two active layers. It is preferred that, if an electrical voltage is applied, one active layer contracts while the second active layer expands, whereby advantageously bending of the cantilever is achieved, which is particularly amplified compared to a unimorphic cantilever, so it has a greater amplitude with the same applied voltage, for example.

In an exemplary embodiment, the cantilever has a length of 1.511 µm, a width of 1.268 µm, and a thickness of 45 µm and is mounted for vibration, particularly along the width, and otherwise detached. The cantilever preferably comprises a piezoelectric material, particularly aluminum nitride (AlN) and comprises electrodes which are optimized, for example, for the excitation of a roof tile-shaped vibration mode, e.g. by two pairs of electrodes, wherein each electrode preferably covers half of the sensor and the piezoelectric material can be set into different even and odd vibration modes by parallel or antiparallel electrical excitation by the electrodes [2].

In addition to the material and geometric shape of the cantilever, the vibration mode of a cantilever is preferably determined by an arrangement of electrodes and/or by the electrical control signal applied.

In another exemplary embodiment, the cantilever may have a length of 1.000 µm and a width of 250 µm and may also comprise AlN. For example, an electrode can be arranged on an upper surface of the cantilever and divided into two roughly equal strips, wherein one strip acts as an excitation electrode to which an electrical control signal is preferably applied and the other strip is used for an electrical measurement of the vibration properties as described below.

In a preferred embodiment of the invention, the piezoelectric bending beam has two electrodes and a piezoelectric intermediate layer made of a material selected from the group containing lead zirconate titanate (PZT), aluminum nitride (AlN), or zinc oxide (ZnO).

These materials have particularly advantageous piezoelectric properties. Piezoelectric bending beams can be particularly easily electrically controlled using two electrodes and caused to vibrate using an electrical control signal. The two electrodes can preferably be placed on a surface of the cantilever, e.g. can be arranged at the top or bottom, next to one another, and/or at the top or bottom on opposite surfaces of the cantilever. At least one electrode can also be arranged inside, for example, in an intermediate layer of the cantilever. The material and/or arrangement of the electrodes are preferably selected for desired vibration properties or the desired vibration mode in the case of an active excitation with and/or without interaction with sound pressure waves.

In another preferred embodiment of the invention, the analysis volume comprises a sample chamber and a reference chamber, wherein the infrared emitter is arranged in such a way that it irradiates the sample chamber and not the reference chamber, and there is a connection channel between the sample chamber and reference chamber in which the structure capable of vibrating is located. This embodiment is characterized by a particularly error-free or fail-passive PAS, since particularly sound from undesired sound sources is excluded or not included in the measurement during the measurement and/or the evaluation of the measurement. In a particularly preferred embodiment, the analysis volume comprises a sample volume and a reference volume, which preferably have at least approximately the same, particularly identical dimensions. There is advantageously a transition area between the sample volume and the reference volume, in which area the sound detector is preferably located. Sample volume and reference volume can preferably also be referred to as sample chamber and reference chamber, and the transition area between them can also be referred to as a connecting channel. Preferably, only the sample volume is exposed to the modulated IR radiation. As a result of the absorption of the modulated radiation in the sample volume, other pressure conditions can develop due to the sound pressure waves that are generated, which are superimposed with pressure conditions which preferably relate to both the sample volume and the reference volume and can arise from a statistical pressure within the analysis volume as well as from preferably unwanted sound pressure waves from external noise sources. In this way, a differential measurement method can preferably be implemented in which interfering pressures and/or pressure fluctuations are preferably excluded or not measured and the sound pressure waves generated due to the absorbed, modulated radiation remain as the measured variable.

The sound detector as a structure can preferably separate the sample and reference volumes directly from one another (preferably in a substantially pressure-tight manner) and comprise a vibratory separating membrane and/or a valve between these areas as well as a partially permeable valve or membrane, which, however, reacts sensitively to pressure differences between the two volumes, for example because it only allows delayed pressure equalization and thus forces mediated by the pressure can preferably act on the structure.

The sound detector can preferably also be completely impermeable to the gas or gases on both sides of the structure, wherein the membrane preferably is a thin, vibratory layer which can be influenced by dynamically varying pressure differences during a vibration.

It may also be preferred that the transition area is at least partially permeable to gas present in the volumes, wherein the sound detector is arranged in the transition area, but preferably does not represent a spatially completely separating element between the two volumes, but at the same time reacts particularly sensitively to pressure differences between the two volumes, and its vibration behavior can be influenced.

It is preferred that the same gas is located in the sample volume and in the reference volume.

It may also be preferred that different gas is included in the sample volume and in the reference volume, wherein a gas with known properties is present in the reference volume and a gas to be analyzed is present in the sample volume.

By using two volumes and at least one sound pressure detector, elimination of sources of error, such as unwanted sound waves, can advantageously be improved because these act on both volumes and the sound pressure detector arranged between the volumes preferably substantially only detects the sound pressure waves in the sample volume caused by the IR radiation relevant for the PAS as a differential signal between the sample volume and the reference volume.

In a preferred embodiment, each of the two volumes comprises at least one sound pressure detector, such that the sound pressure detector preferably only measures unwanted pressure fluctuations caused by external (sound) sources in the reference volume and in the sample volume, the sound pressure waves caused by the modulation are detected in addition to the unwanted pressure fluctuations if the modulated IR radiation is absorbed. In this embodiment, the undesired signals can advantageously be excluded during further (electronic) processing of the measurement signals, particularly by forming the difference.

In another preferred embodiment of the invention, the measuring unit of the sound detector is an optical measuring unit, preferably comprising a photon emitter for generating a photon beam and a photodetector, wherein the photon emitter is aligned with the structure capable of vibrating in such a manner that the vibration properties of the structure capable of vibrating, preferably the amplitude of a vibration of the structure capable of vibrating, can be measured by means of the photodetector.

In this embodiment, the photon emitter is aligned with the structure capable of vibrating, that means particularly that a light or photon beam emitted by the photon emitter is aligned with the structure capable of vibrating and its radiation is substantially or partially reflected by the structure. For this purpose, the spectrum of the emission of the photon emitter and/or the surface of the structure on which the reflection takes place can preferably be matched, such that the beam is substantially or at least partially reflected. The photon emitter, photodetector and/or the structure are preferably aligned with one another in such a way that the beam reflected by the structure is substantially or partially absorbed in a detection surface of the photon detector and preferably converted by the detector into a measurable and/or readable electrical or electronic signal which allows statements about the vibration properties of the structure.

It is particularly preferred that the optical measuring unit comprises other optical elements, such as a beam splitter, and the photon emitter is a laser, such that the vibration properties of the structure can be read out by the optical measuring unit via an interferometric measurement. Particularly, a partial beam reflected on the structure is superimposed on a partial beam not reflected from the structure, wherein both partial beams are substantially or partially coherent with one another and interfere with one another. By measuring the resulting constructive or destructive interference of the partial beams, preferably with knowledge of the distances covered by the partial beams when reflected from a non-vibrating structure, statements can be made about the relative path length differences of the partial beams and/or the current position of the structure, wherein statements about the vibration properties of the structure can particularly be made based on measurement over time.

In another preferred embodiment of the invention, the measuring unit of the sound detector is an electrical measuring unit, preferably for measuring vibration properties of the structure capable of vibrating, particularly the amplitude of a vibration of the structure capable of vibrating, primarily by means of an impedance measurement and/or a capacitive measurement.

An impedance particularly describes the ratio of an electrical voltage to an electrical current, wherein sinusoidal voltages and currents are used as a basis and the impedance preferably includes information about the ratio of the amplitudes of the voltages and currents as well as their phase relationship to one another. Particularly in the case of a structure that comprises at least one piezoelectric material, the impedance can preferably be measured on the structure, particularly on the electrodes, which is dependent on the vibration properties due to the deformation of the structure and its piezoelectric properties. This impedance can preferably also be read from the electrodes to which an electrical control signal is applied to excite the vibration. In this case, the voltage of the control signal is preferably superimposed with a voltage or current that can be measured due to the deformation and/or the vibration properties and their influence on the impedance.

This voltage and/or this current preferably has a different amplitude and/or a phase shift in relation to the control signal, which can be measured, particularly by using the lock-in technique with the aid of a lock-in amplifier. An electrical signal proportional to the electrical control signal can preferably be applied as a reference at the input of the lock-in amplifier, and the impedance of the structure capable of vibrating can be measured in comparison to the reference signal by the lock-in amplifier, preferably using further electronic components. In this way, statements can particularly be made about the phase ratio of the impedance to the reference signal and/or the amplitude of the impedance, which enables determination of the vibration properties of the structure.

It may also be preferred to apply the electrical modulation signal for modulating the IR radiation as a reference signal at the input of a lock-in amplifier, such that only modulations of the vibration properties at substantially this frequency are filtered out during the measurement.

It may also be preferred to measure an impedance on additional electrodes to which no electrical control signal is applied at the same time. Particularly, due to the direct piezoelectric effect, a current and/or a voltage can be measured there, which is suitable for measuring the vibration properties of the structure.

A particularly low-noise measurement with a high signal-to-noise ratio can be implemented using lock-in technology.

A measurement of the electrical properties of the structure, preferably a flowing current and/or an applied voltage and particularly an impedance, which are preferably tapped at electrodes of the structure, can preferably also be used to measure the vibration properties if the vibration of the structure is not excited based on a piezoelectric effect. In this case, the structure can particularly comprise a piezoelectric and/or piezoresistive material whose electrical properties are measured, which properties change as a result of the deformation due to the vibration properties.

An electrical measuring unit can preferably be used for a capacitive measurement of the structure capable of vibrating. A capacitive measurement particularly includes a measurement of an electrical capacitance. Preferably, the structure can have at least one electrode for such a measurement, wherein a capacitance between this electrode and an electrode which does not resonate with the structure and which is preferably permanently installed on the analysis volume is measured, for example. The capacitance of the electrodes or a voltage that can be measured between the electrodes and/or an impedance of the capacitor formed by the electrodes, changes, particularly due to a distance between the electrodes that changes due to the vibration properties, particularly an instantaneous deflection of the structure, which variables can be measured, for example, by applying an alternating current and/or an alternating voltage.

In another preferred embodiment of the invention, the modulatable infrared emitter comprises a heating element, wherein the heating element comprises a substrate onto which a heatable layer made of a conductive material is at least partially applied, which substrate comprises contacts for a current and/or voltage source, wherein the substrate is preferably selected from a group comprising silicon, monocrystalline silicon, polysilicon, silicon dioxide, silicon carbide, silicon germanium, silicon nitride, nitride, germanium, carbon, gallium arsenide, gallium nitride, and/or indium phosphide and/or the conductive material for forming the heatable layer is preferably selected from a group comprising platinum, tungsten, (doped) tin oxide, monocrystalline silicon, polysilicon, molybdenum, titanium, tantalum, titanium-tungsten alloy, metal silicide, aluminum, graphite, and/or copper.

The heating element comprises a heatable layer made of a conductive material which produces Joule heat when an electrical current flows through it. Particularly, the heating element comprises a substrate on which the heatable layer is present. The substrate preferably forms the base of the heating element. In this case, the substrate can also at least partially comprise further elements of the IR emitter, such as, for example, the base element and/or housing elements. The substrate can advantageously be suitably shaped by established process steps, particularly from semiconductor and/or microsystem manufacture. The aforementioned materials are particularly easy and inexpensive to process in semiconductor and/or microsystem production and are also well suited for mass production. These materials are also particularly suitable for doping and/or coating in order to achieve the desired electrical, thermal, and/or radiation properties in specific areas.

In another preferred embodiment of the modulatable infrared emitter, the conductive material for forming the heatable layer is selected from the group comprising platinum, tungsten, (doped) tin oxide, monocrystalline silicon, polysilicon, molybdenum, titanium, tantalum, titanium-tungsten alloy, metal silicide, aluminum, graphite, and/or copper. On the one hand, these materials have the desired thermal, electrical, mechanical, and/or radiation properties and are also particularly easy and inexpensive to process.

The (micro) heating element is preferably at least partially detached and allows e.g. thermal expansions within the IR emitter due to strong temperature changes and translational movements. Partially detached means that it is at least partially not frictionally and/or positively connected to other elements of the emitter at the interfaces and therefore has a degree of freedom of movement in a direction substantially perpendicular to the interface.

In a preferred embodiment of the invention, the control device is configured to regulate the temperature of the heating element in a range between 50° C. and 1000° C., preferably between 100° C. and 1000° C.

Such a control device is preferably able to provide the heating element with suitable electrical power. Particularly, the temperature should be adjustable, kept constant, and/or be modulated with sufficient accuracy. A control mechanism with a feedback loop can be used for this. To measure the current temperature of the heating element, at least one temperature sensor can be integrated at a suitable point on the element, for example.

It may be particularly preferred to modulate the temperature in the range mentioned to modulate the IR radiation. The temperature is preferably modulated between a maximum temperature and a minimum temperature, wherein at least the maximum temperature is within the above-mentioned temperature range.

In another aspect, the invention relates to a method for analyzing gas, comprising
a. Provision of a photoacoustic spectroscope for analyzing gas according to any one of the preceding claims
b. Irradiation of the gas with infrared radiation modulated at a modulation frequency to generate sound pressure waves
c. Excitation of the structure capable of vibrating with an excitation frequency
d. Measurement of the vibration properties of the structure capable of vibrating, which depends on the sound pressure
e. Determination of the sound pressure of the gas based on the measured vibration properties.

The average person skilled in the art recognizes that technical features, definitions and advantages of preferred embodiments of the photoacoustic spectroscope according to the invention also apply to the method according to the invention.

In a preferred embodiment of the invention, the time profile of the sound pressure waves generated by means of the modulated infrared radiation is determined. Particularly, the sound pressure waves can be measured over time by measuring a time series of the vibration properties, which advantageously allows further knowledge about the gas to be analyzed, e.g. on the relaxation behavior after excitation by modulated IR radiation. In this case, not only sound pressure waves can preferably be measured within the gas, but also a constant or slowly changing pressure. As a result, the properties of the gas can preferably also be measured when sound pressure waves start and/or decay, particularly a relaxation behavior of the gas.

DETAILED DESCRIPTION

The invention will be explained in more detail below using examples, without being limited to these.

Simple Pressure Measurement of an Ambient Gas with a Structure that can Vibrate:

Below, the theoretical fundamentals for a pressure measurement of an ambient gas will be explained as an example.

In the context of resonantly vibrating structures, especially MEMS structures, the Qfactor (abbreviated from Quality factor) is an important parameter [1]. The Q factor (also called quality factor) is preferably defined as $2\pi$ times the ratio of the energy stored in the vibrating structure to the energy loss during a vibration period. The energy loss is caused particularly by the damping of the vibration. The damping is preferably due to both internal frictional losses within the structure and external losses, e.g. by collisions of the vibrating structure with gas molecules of the ambient gas, preferably also called viscous damping. Therefore, there preferably is an interaction of the vibrating structure with the gas environment, particularly via the pressure conditions of the gas environment, particularly over time, which advantageously also includes the interaction with sound pressure waves. For example, the dynamic behavior of the mechanically vibrating system is influenced by the viscous damping of the ambient gas, preferably due to the pressure conditions of the gas, for example by a shift in the resonance frequency and/or a change in the vibration amplitude. For vibrating systems such as the vibrating structure capable of vibrating, which can preferably be substantially described by a differential equation of the second order, there is the following dependency of the resonance or natural frequency (preferably without damping) of the system with preferably weak damping (preferably damping between 0 and 1) of the system:

$\omega_0 = (K/M)^{1/2}$, wherein K is preferably the spring constant describing the structure capable of vibrating and M is preferably the mass of the structure. Due to the influence of the damping on the vibration behavior of the structure, the actual resonance frequency with damping $\omega_d$ preferably shifts compared to wo as follows:

$\omega_d = \omega_0 (1-\xi^2)^{1/2}$, wherein $\xi$ (describes the damping ratio.

The damping ratio can therefore advantageously be measured or estimated using the measured resonance frequency $\omega_{n,meas}$ and the measured quality factor $Q_{meas}$:

$\xi = C_n/(2m\omega_{n,meas})$, wherein m is preferably the mass of the structure and $C_n$ is preferably the damping coefficient, which is preferably defined as follows:

$C_n = m\omega_{n,meas}/Q_{meas}$.

$Q_{meas}$ is preferably measured by measuring the resonance frequency $\omega_{n,meas}$ and the half-width of the resonance $\Delta\omega$ and is particularly $Q_{meas} = \omega_{n,meas}/\Delta\omega$, wherein the half-width is preferably defined as the frequency spacing between the two frequencies at which the vibration amplitude is $1/\sqrt{2}$ of the maximum vibration amplitude (in resonance), or where the vibration intensity is half of the maximum vibration intensity (in resonance). This applies preferably at least at pressures above a negative pressure and/or vacuum pressure, preferably above 0.01 mbar, particularly preferably above 0.1 mbar, more preferably above 1 mbar, particularly above 10 mbar, wherein mbar are preferably millibars, i.e. preferably $10^{-3}$ bar, wherein 1 bar corresponds particularly to $10^5$ Pascal (abbr.: Pa).

In these pressure ranges, there is preferably a measurable and/or calculable relationship between the damping of the structure capable of vibrating and the pressure of the ambient gas, which pressure particularly intercepts the formation of the sound pressure waves. Thus, the pressure and particularly the sound pressure waves can preferably be precisely measured by means of a structure capable of vibrating.

Manufacture of a Piezoelectric Cantilever:

A manufacturing method for a piezoelectric cantilever made of AlN is described below as an example [1]. For this purpose, a 4" p-doped silicon wafer (100) 450 μm in thickness is in a first step oxidized on both sides in a dry atmosphere at 1.000° C. for passivation. The $SiO_2$ layer formed is preferably about 130 nm thick, wherein the silicon substrate preferably has a low specific resistance (<0.1 ohm cm) and forms a lower electrode of the cantilever. In a second step, a 400 nm thick $Si_3N_4$ layer is deposited on the underside of the wafer, preferably by plasma-enhanced chemical vapor deposition (PECVD), in order to act as a mask layer for KOH etching (KOH: potassium hydroxide) of silicon. Next, the $SiO_2$ and $Si_3N_4$ layers are preferably removed from above to expose both the lower electrode and the suspended beam or cantilever. Likewise, these layers are removed from the underside where the suspended beam is to be placed, preferably using fluoric acid (HF) (step 3). In a fourth step, a 1.000 nm thick AlN film is reactively separated from an aluminum (Al) target in a pure nitrogen atmosphere in a sputtering device (e.g. Von Ardenne). The substrate is preferably nominally unheated. The ambient pressure is preferably set to about $4\times10^{-3}$ mbar in order to achieve a good c-oriented thin film of AlN with an effective $d_{33}=3$ pm/V. Under these separation conditions, the sputtering rate is preferably about 20 nm/min at 1.000 W. A conventional photoresist (AZ1518) is preferably used as a mask for wet chemical removal of AlN from the lower electrode region and from the region of the silicon membrane, which is later etched through at a suitable site to produce the unilaterally suspended structure of the cantilever (step 5). At the parameters mentioned, the AlN etching rate is preferably about 10 nm s$^{-1}$. In a sixth step, an upper electrode and a contact point for the silicon body used as a lower electrode is formed by sputtering and subsequent structuring of an approximately 500 nm thick layer of gold (Au) in aqua regia (preferably concentrated hydrochloric acid (HCl) and concentrated nitric acid (HNO 3) in a ratio of 3 to 1). A thin layer of chromium (Cr) (thickness preferably about 20 nm) is preferably used as an adhesion layer between AlN and Au, wherein a conventional Cr etchant is preferably used for structuring. After the structuring of the upper electrode is complete, 38% potassium hydroxide (KOH) at 85° C. is preferably used in order to structure the substrate in these areas with a residual thickness of 20 µm (step 7). For manufacturing the suspended structures, exposure of the front side of the AlN actuator of the silicon-based cantilever for free swinging is preferably carried out using a Bosch method (step 8).

DETAILED DESCRIPTION OF THE DRAWINGS

Figure 1:
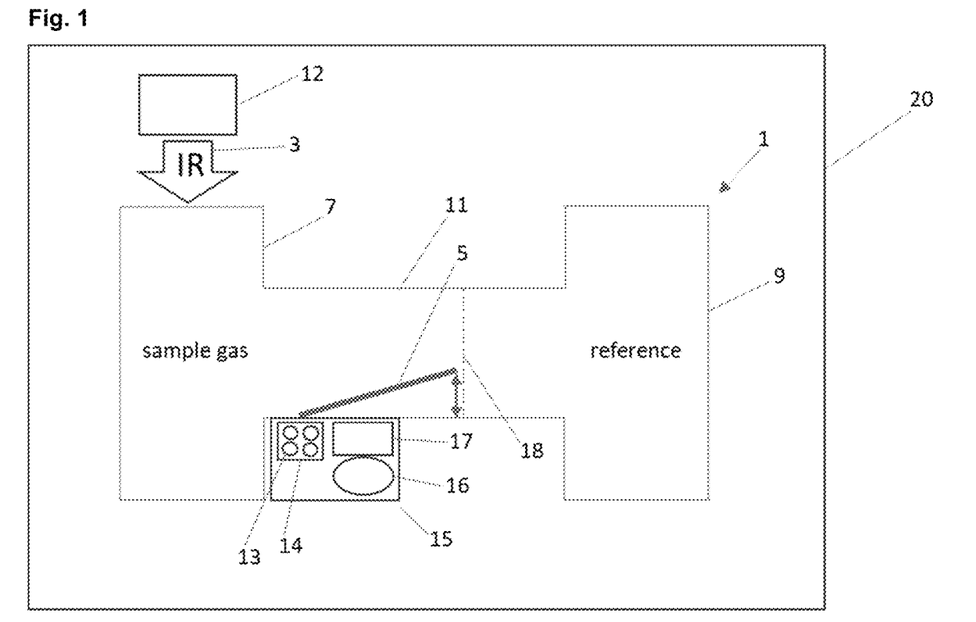
FIG. 1 A photoacoustic spectroscope for analyzing gas including a modulatable infrared emitter, an analysis volume comprising a sample chamber and a reference chamber as well as a sound pressure detector with a structure capable of vibrating in the connecting channel between the two chambers.

FIG. 1 shows a photoacoustic spectroscope (20) that comprises a modulatable infrared emitter (12) and an analysis volume 1 comprising a sample chamber 7 and a reference chamber 9 as well as a sound pressure detector (15) with a structure capable of vibrating 5 in the connecting channel 11 between the two chambers. In this exemplary embodiment, both chambers contain the same gas to be analyzed, wherein only the sample chamber is exposed to modulated IR radiation 3. The structure capable of vibrating 5, in this case a bending beam or cantilever in the connecting channel 11 between the two chambers, in a transition area between the sample volume and the reference volume (18), is excited to an active vibration by the actuator (17) with a control unit (16), and the measuring unit (14 not shown), which contains a array of sound pressure detectors (13), measures the vibration properties of the structure capable of vibrating, e.g. vibration amplitude, vibration frequency, phase of the vibration with respect to the excitation and/or resonance frequency of the structure capable of vibrating 5. These vibration properties depend on the formation of the sound pressure waves that the structure capable of vibrating 5 experiences. These can also contain sound pressure waves from undesired sound sources in addition to the sound pressure waves due to an absorption of the modulated IR radiation 3 of the gas to be analyzed in the sample chamber 7. Since the undesired sound pressure waves preferably reach both the reference chamber 9 and the sample chamber, they preferably act on both sides of the cantilever to the same extent, wherein the sound pressure waves of the PAS from the sample chamber 7 only act on the structure capable of vibrating 5 from the direction of this sample chamber 7 and therefore can be measured by it substantially without a measurement of the undesired sound pressure waves.

Figure 2:
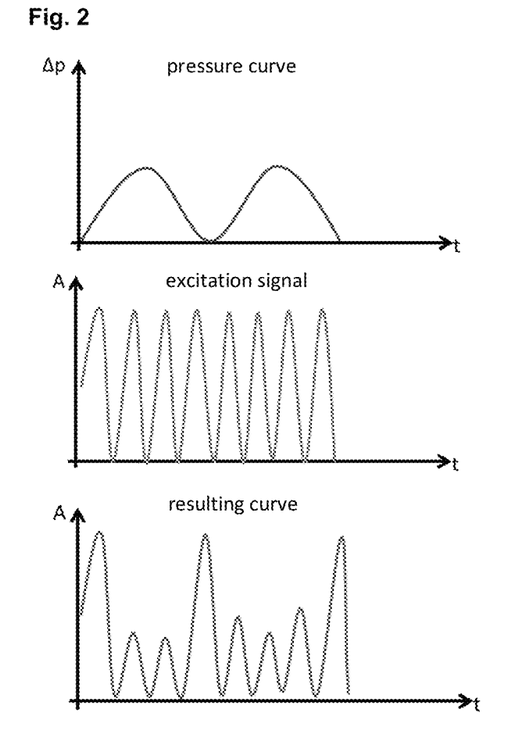
FIG. 2 Temporal progression of the pressure of a sound pressure wave (top) as well as a vibration amplitude or intensity, once without the damping effect of a sound pressure wave (center) and once with the influence of the sound pressure wave (bottom).

The top part of FIG. 2 shows an example of a time curve of a pressure to be measured of a sound pressure wave due to a PAS excitation of gas molecules. The center part of the figure shows the vibration properties of the structure capable of vibrating 5 excited by the actuator without the external influence due to the sound pressure wave. Particularly, the vibration amplitude or the vibration intensity is plotted over time, the periodicity of which, however, also allows conclusions to be drawn about the vibration frequency. The bottom part of the figure shows the resultant if the sound pressure waves of the top part of the figure interact with a vibration of the structure capable of vibrating 5 from the center part of the figure. The illustration shows schematically how the vibration properties of the structure capable of vibrating 5 are influenced by the sound pressure waves, which, by measuring the vibration properties, allows direct conclusions to be drawn about the formation of the sound pressure waves and thus about the composition of the gas in the sample volume according to FIG. 1. Particularly, influencing the vibration amplitude or vibration intensity of the structure capable of vibrating 5 can be seen, particularly by modulating the envelope of the vibration.

Figure 3:
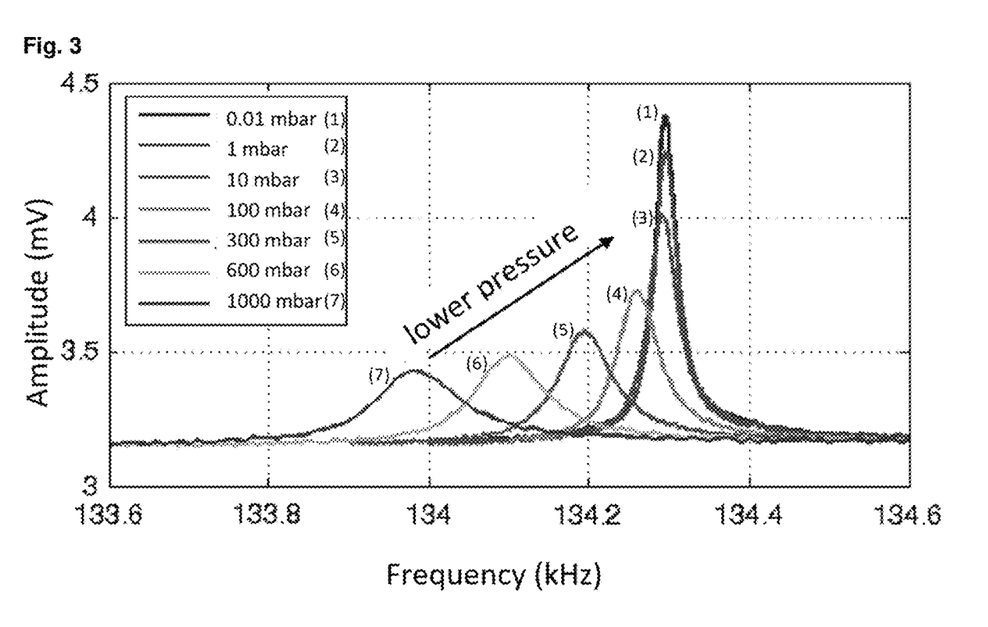
FIG. 3 The influence of an ambient pressure on the vibration properties of the structure capable of vibrating, particularly on the resonance frequency.

FIG. 3 shows the influence of an ambient pressure on the vibration properties of the structure capable of vibrating 5, particularly on the resonance frequency [1] of the structure capable of vibrating and the respective vibration amplitude. During this measurement, the pressure was varied statistically, and the resonance frequency and its vibration amplitude were measured at different static pressures. Particularly at pressures in the range of atmospheric pressure, a strong dependence of the resonance frequency on the ambient pressure of the structure capable of vibrating 5 is visible, due to a damping of the vibration through impacts of the structure 5 with the gas molecules of the environment. At a sufficiently high sampling rate, this measurement at static pressures can also be used for dynamic pressure variations due to sound pressure waves which are caused by the absorption of modulated IR radiation by the gas molecules. At low pressures from about 10 mbar, only a smaller influence of the ambient pressure on the vibration properties of the structure capable of vibrating 5 is shown. At such low pressures, the influence of the intrinsic damping of the structure 5 generally outweighs that of external damping due to the pressure of the surrounding gas. However, even at these low pressures, statements can preferably be made on the basis of a measurement of the vibration properties, if the resolution of the measurement of the frequency and the vibration amplitude or vibration intensity would be increased, for example.

LIST OF REFERENCE NUMERALS 1 analysis volume
3 modulated infrared radiation
5 structure capable of vibrating
7 sample chamber
9 reference chamber
11 connection channel
12 modulatable infrared emitter
13 array of sound pressure detectors
14 measuring unit
15 sound pressure detector
16 control unit
17 actuator
18 transition area between the sample volume and the reference volume
20 photoacoustic spectroscope

REFERENCES

[1] Abdallah Ababneh, A. N. Al-Omari, A. M. K. Dagamseh, H. C. Qiu, D. Feili, V. Ruiz-Díez, T. Manzaneque, J.

Hemando, J. L. Sánchez-Rojas, A. Bittner. U. Schmid; H. Seidel: *Electrical characterization of micromachined AlN resonators at various back pressures*, Microsyst Technol 20: 663-670, 2014.

[2] G Pfusterschmied, M. Kucera, E. Wistrela, T. Manzaneque, V. Ruiz-Díez, J. L. Sánchez-Rojas, A. Bittner and U. Schmid et al: *Temperature dependent performance of piezoelectric MEMS resonators for viscosity and density determination of liquids*, J. Micromech. Microeng. 25 105014, 2015.

The invention claimed is:

1. A photoacoustic spectroscope for analyzing gas, comprising:
a modulatable infrared emitter,
an analysis volume that can be filled with gas, and
a sound pressure detector,
wherein the modulatable infrared emitter, the analysis volume, and the sound pressure detector are arranged such that the infrared radiation modulatably emittable from the infrared emitter can excite gas in the analysis volume to form sound pressure waves which are measured using the sound pressure detector,
wherein the sound pressure detector comprises a structure capable of vibrating, an actuator, and a measuring unit, wherein the actuator is configured to actively excite vibration of the structure capable of vibrating and the measuring unit is configured for measuring the vibration properties of the structure capable of vibrating, which measurement depends on the formation of the sound pressure waves, and wherein the modulation frequency of the infrared emitter is between 1 Hz and 200 Hz, while the excitation frequency of the structure capable of vibrating is between 1 kHz and 200 kHz.

2. The photoacoustic spectroscope according to claim 1, wherein the spectroscope comprises a control unit which is configured to excite the structure capable of vibrating to vibrate using an excitation frequency and to control the modulatable infrared emitter in such a manner that the modulatable infrared emitter it emits infrared radiation modulated with a modulation frequency, wherein the modulation frequency of the infrared emitter is smaller than the excitation frequency of the structure capable of vibrating by a factor of 2 or more.

3. The photoacoustic spectroscope according to claim 2, wherein the modulation frequency of the infrared emitter is smaller than the excitation frequency of the structure capable of vibrating by a factor of 5 or more.

4. The photoacoustic spectroscope according to claim 1, wherein the excitation frequency of the structure capable of vibrating corresponds to a resonance frequency of the structure capable of vibrating.

5. The photoacoustic spectroscope according to claim 1, wherein the spectroscope comprises an array of sound pressure detectors.

6. The photoacoustic spectroscope according to claim 1, wherein the actuator is a MEMS actuator.

7. The photoacoustic spectroscope according to claim 6 wherein the MEMS actuator is selected from the group consisting of an electrostatic actuator, a piezoelectric actuator, an electromagnetic actuator, and a thermal actuator.

8. The photoacoustic spectroscope according to claim 1, wherein the structure capable of vibrating comprises a bending beam, a valve, and/or a membrane.

9. The photoacoustic spectroscope according to claim 1, wherein the sound pressure detector comprises a piezoelectric beam.

10. The photoacoustic spectroscope according to claim 9, wherein the piezoelectric beam is arranged as a cantilever in the analysis volume.

11. The photoacoustic spectroscope according to claim 10, wherein the piezoelectric beam is a piezoelectric bending beam that comprises two electrodes and a piezoelectric intermediate layer made of a material selected from the group containing lead-zirconate-titanate (PZT), aluminum nitride (AlN), or zinc oxide (ZnO).

12. The photoacoustic spectroscope according to claim 1, wherein the analysis volume comprises a sample chamber and a reference chamber, wherein the modulatable infrared emitter is arranged in such a manner that the modulatable infrared emitter irradiates the sample chamber and not the reference chamber, and wherein a connection channel is present between the sample chamber and reference chamber in which channel the structure capable of vibrating is located.

13. The photoacoustic spectroscope according to claim 1, wherein the measuring unit of the sound detector is an optical measuring unit.

14. The photoacoustic spectroscope according to claim 13, wherein the optical measuring unit comprises a photon emitter for generating a photon beam and a photodetector, wherein the photon emitter is aligned with the structure capable of vibrating in such a manner that the vibration properties of the structure capable of vibrating are measured by means of the photodetector.

15. The photoacoustic spectroscope according to claim 1, wherein the measuring unit of the sound detector is an electrical measuring unit.

16. The photoacoustic spectroscope according to claim 15 wherein the electrical measuring unit is for measuring the vibration characteristics of the structure capable of vibrating by an impedance measurement and/or a capacitive measurement.

17. The photoacoustic spectroscope according to claim 1, wherein the modulatable infrared emitter comprises a heating element.

18. The photoacoustic spectroscope according to claim 17, wherein the heating element comprises a substrate onto which at least partially a heatable layer of a conductive material is applied, which substrate comprises contacts for a current and/or voltage source.

19. The photoacoustic spectroscope according to claim 18, wherein the substrate is selected from a group consisting of silicon, monocrystalline silicon, polysilicon, silicon dioxide, silicon carbide, silicon germanium, silicon nitride, nitride, germanium, carbon, gallium arsenide, gallium nitride, and indium phosphide and/or the conductive material for forming the heatable layer is selected from the group consisting of platinum, tungsten, (doped) tin oxide, monocrystalline silicon, polysilicon, molybdenum, titanium, tantalum, titanium-tungsten alloy, metal silicide, aluminum, graphite, and copper.

20. The photoacoustic spectroscope according to claim 1, wherein the control device is configured to regulate the temperature of the heating element in a range between 50° C. and 1000° C.

21. The photoacoustic spectroscope according to claim 20, wherein the control device is configured to regulate the temperature of the heating element in a range between 100° C. and 1000° C.

22. A method for analyzing gas, comprising:
a. providing a photoacoustic spectroscope for analyzing gas according to claim 1, b. irradiating the gas with infrared radiation modulated at a modulation frequency to generate sound pressure waves,
c. exciting the structure capable of vibrating with an excitation frequency,
d. measuring the vibration properties of the structure capable of vibrating, which depends on the sound pressure, and
e. determining the sound pressure of the gas based on the measured vibration properties.

23. The method for analyzing gas according to the claim 22, further comprising determining a time profile of the sound pressure waves generated by means of the modulated infrared radiation.

* * * * *

UNITED STATES PATENT AND TRADEMARK OFFICE
CERTIFICATE OF CORRECTION

PATENT NO. : 11,879,832 B2
APPLICATION NO. : 17/310818
DATED : January 23, 2024
INVENTOR(S) : Daniel Biesinger Page 1 of 1

It is certified that error appears in the above-identified patent and that said Letters Patent is hereby corrected as shown below:

In the Specification

Column 15, Line 56, delete "overtime," and insert -- over time, --.

Column 25, Line 62 (approx.), delete "(describes" and insert -- describes --.

Column 27, Line 43, delete "(14 not shown)," and insert -- (14), --.

Column 29, Line 1, delete "Hemando," and insert -- Hernando, --.

Column 29, Line 1, delete "Schmid;" and insert -- Schmid, --.

In the Claims

Column 29, Line 40, Claim 2, after "emitter" delete "it".

Signed and Sealed this
Seventh Day of January, 2025

Derrick Brent
*Acting Director of the United States Patent and Trademark Office*